June 29, 1965 SHUNSAKU NAKAUCHI 3,191,834

TAPE DRIVING SYSTEM FOR TAPE RECORDERS

Filed Sept. 17, 1962

INVENTOR:
SHUNSAKU NAKAUCHI

BY Otto John Munz

ATTORNEY.

United States Patent Office 3,191,834

Patented June 29, 1965

3,191,834

TAPE DRIVING SYSTEM FOR TAPE RECORDERS

Shunsaku Nakauchi, Tokyo, Japan, assignor to Tohoku Oki Electric Company Limited, Fukushima Prefecture, Japan, a corporation of Japan Filed Sept. 17, 1962, Ser. No. 224,152

Claims priority, application Japan, Sept. 27, 1961, 36/34,560

2 Claims. (Cl. 226—38)

This invention relates to tape driving systems for tape recorders.

In a conventional tape recorder, in order to bring a tape into close contact with a magnetic head, a tension is applied to the tape by braking a tape reeling shaft or by giving a torque in the direction reverse to the tape reeling direction of a capstan by using an electric motor so that the tension of the tape may be utilized to get the close contact of the tape with the magnetic head or a tape pad is used to press the tape into close contact with the magnetic head. However, the method wherein the motor is used on the supply tape reeling shaft or the friction brake is applied has a drawback that the tension in the reverse direction varies depending on the amount of the tape wound on the reel and the method wherein the tape is pressed with the pad has drawbacks that the adjustment of the pad is difficult, vibration is caused and the life of the device is short.

Due to these drawbacks, it has been a limit in the conventional tape driving mechanism to keep the deviation of the average velocity of the tape less than ±0.3% and the wow flutter less than 0.15%. Further, in a mechanism wherein reproduction is possible in either of rightward and leftward running directions of the tape, in the system with one capstan, it is more difficult to secure the performance than in the case of reproduction in only one direction and, in the case of reproduction in both directions, the wow flutter will be usually about 0.4%.

The present invention is of a tape driving system wherein first and second capstans for supplying and taking up a tape in contact are provided and the peripheral velocity of the first capstan for supplying the tape is made lower than that of the second capstan for taking up the same tape.

An object of the present invention is to provide a tape driving system wherein a stabilized tension is given to a tape so that the wow flutter may be reduced and the average velocity may be stabilized.

In the accompanying drawings.

Figure 1:
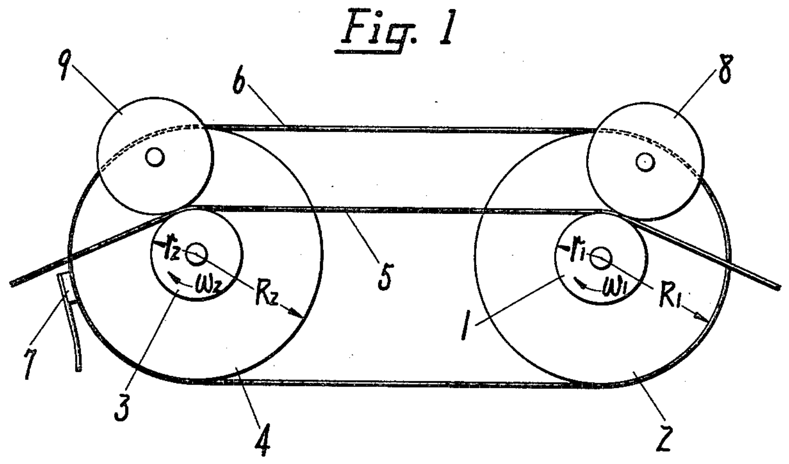
FIGURE 1 is a view showing an embodiment of the tape driving system according to the present invention.

With reference to FIGURE 1, a first capstan 1 is coaxial with a pulley 2 and is driven at an angular velocity $\omega_1$ by means of an electric motor (not illustrated). On the other hand, a second capstan 3 is coaxial with a pulley 4 which is rotated through a belt 6 from said pulley 2. However, the rotating angular velocity $\omega_2$ of the second capstan 3 is limited by a brake 7 in contact with the pulley 4. Pinch rollers 8 and 9 act to press a tape 5 into contact with the capstans 1 and 3, respectively.

Now, in the drawing, if the spring constant of the belt is $k_b$ and the spring constant of the tape is $k_t$, the ratio of the tension $T_b$ of the belt to the tension $T_t$ of the tape will be given by $$\frac{T_b}{T_t}=\frac{k_b(\omega_1R_1-\omega_2R_2)}{k_t(\omega_1r_1-\omega_2r_2)} \tag{1}$$

In the Equation 1, if the design is so made that $$\frac{R_1}{R_2}=\frac{r_1}{r_2}=k$$

then $$\frac{T_b}{T_t}=\frac{k_bR_1}{k_tr_1} \tag{2}$$

will be established.

Then, from the Equation 2, the ratio of the power $W_b$ transmitted by the belt 6 to the power $W_t$ transmitted by the tape 5 will be $$\frac{W_b}{W_t}=\frac{k_b}{k_t}\left(\frac{R_1}{r_1}\right)^2 \tag{3}$$

Now, if the required tension $T_t$ of the tape and the velocity $v$ of the tape are given, the power $W_t$ will be given as follows:

$$W_t=T_t\times v$$

Then, from the Equation 3, $W_b$ can be also obtained.

Therefore, it is found that, if $k_t$, R and $r$ are designed so that the Equation 3 may be established and a brake represented by $W_b+W_t$ is given, the tension $T_t$ of the tape will automatically become equal to the designed value. It is needless to say that the spring constant $k_t$ of the tape will be necessarily determined in case the tape to be used is determined.

As described above, in the system according to the present invention, in case the tape to be used and the velocity and tension of the tape are determined, the required design values will be determined and a constant tension as defined by the design values will be able to be given. The above mentioned brake is to reduce the peripheral velocity of the second capstan.

Figure 2:
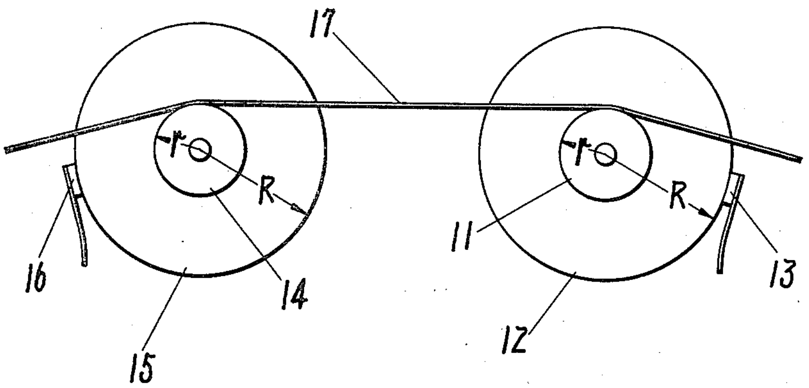
FIGURE 2 is a view showing a modified embodiment of the tape driving system according to the present invention.

In the driving system according to the present invention, if two capstan systems are designed to be symmetrical on the right and left as shown in FIGURE 2, the tape will be able to be driven stably in either of rightward and leftward running directions.

In FIGURE 2, a capstan 11, pulley 12 and brake 13 on the right side are formed to be exactly identical with a capstan 14, pulley 15 and brake 16 on the left side, respectively. Now, when a tape 17 is to be moved in the rightward direction, the capstan on the right side may be rotated clockwise as a power side. When the tape 17 is to be moved in the leftward direction, the capstan on the left side may be rotated counterclockwise as a power side. In such case, as the capstan systems are designed to be symmetrical on the right and left, under the same principle as is explained with reference to FIGURE 1, in case the running direction of the tape is either rightward or leftward, the tape will be able to be stably driven with the same constant tension on the tape.

In the above mentioned embodiment, a brake is used to reduce the peripheral velocity of the first capstan for supplying the tape. However, in the present invention, such means is not limited to the brake. For example, the rotation of the first capstan may be reduced by connecting it with the rotary shaft of the second capstan through reduction gears.

The present invention has the following advantages:

(1) Irrespective of the amount of the tape wound on the supply reel, a constant tape tension can be always obtained and therefore the degree of close contact of the tape with the magnetic head can be always made constant.

(2) As two capstans are used, the tape between the supply reel and the first capstan can be placed in a state of substantially no tension applied thereto as compared with the conventional system of one capstan and therefore such average velocity deviation and wow flutter as would be caused by the variation of the tension of the tape on the supply side can be made very small. Thus, according to the present invention, each of the average velocity deviation and wow flutter of the tape can be reduced to be less than 0.1%. Such performance is higher than that of the highest grade conventional tape recorder.

(3) As the tape is in contact with the two capstans, in case the running direction of the tape is either rightward or leftward, the same favorable performance will be able to be obtained. Further, as no friction brake is applied directly to the tape, the damage of the tape can be reduced.

What is claimed is:

1. A tape driving device for tape recorders comprising a first pulley, and means for driving said pulley, a first capstan coaxial with said first pulley, a pinch roller in contact with said first capstan, a second pulley a belt trained about said pulleys, a second capstan coaxial with said second pulley and for taking up the tape, a pinch roller in contact with said second capstan, a brake provided on said second pulley for tensioning the belt whereby the peripheral velocity of the second capstan is made lower than that of the first capstan.

2. A device as in claim 1 further comprising a brake on said first pulley and means for driving the second pulley.

References Cited by the Examiner

UNITED STATES PATENTS

| | | | |
|---|---|---|---|
| 2,590,665 | 3/52 | Williams | 226—187 X |
| 2,705,599 | 4/55 | McCullough | 242—55.12 |
| 2,846,217 | 8/58 | Bormann et al. | 226—187 |
| 3,057,529 | 10/62 | Fitch | 226—49 |

ROBERT B. REEVES, *Acting Primary Examiner.*

ANDRES H. NIELSEN, SAMUEL F. COLEMAN, *Examiners.*